July 17, 1956 S. N. PANTAGES 2,755,461

CYMATOPHONE

Filed June 7, 1951 2 Sheets-Sheet 1

INVENTOR.

BY

July 17, 1956 S. N. PANTAGES 2,755,461

CYMATOPHONE

Filed June 7, 1951 2 Sheets-Sheet 2

INVENTOR.

Steven N. Pantages

BY

Michael S. Striker

Att.

United States Patent Office 2,755,461

Patented July 17, 1956

2,755,461

CYMATOPHONE

Steven N. Pantages, New York, N. Y.

Application June 7, 1951, Serial No. 230,338

9 Claims. (Cl. 343—5)

The present invention relates to a cymatophone. More particularly, the present invention relates to an aid for the blind which helps them to walk and/or to read ordinary handwriting or printed matter in the form of electrically conductive material. However, the present invention can be used for other purposes as well, such as a navigational aid and for preventing collisions of moving land or water vehicles where visibility is poor.

It is an object of the present invention to provide a device of the kind described which has relatively little weight and is small so that it can be easily carried on the person who wants to use it.

The present invention comprises in its broadest aspects in combination, a transmitter for generating high-frequency oscillations, a modulator coupled with the transmitter and modulating the high-frequency oscillations with an audio-frequency, an antenna coupled to the transmitter for emitting the modulated high-frequency oscillations generated by the transmitter, and an indicator coupled to the antenna to indicate any change in the impedance of the antenna caused by the reflections of the waves by an object detected.

Preferably a coaxial line is coupled with the transmitter and the antenna forms the termination of, and is coupled with, the coaxial line. Preferably the coaxial line has a length exceeding a quarter of the wave length of the high-frequency oscillations generated by the transmitter.

In a preferred embodiment of the present invention, a second coaxial line is coupled with the first coaxial line and the indicator is coupled to the second coaxial line.

In a preferred embodiment of the present invention, the antenna emits the modulated high-frequency oscillations generated by the transmitter and picks the same up after reflection thereof and a receiver is coupled to the antenna and receives and demodulates the waves picked up by the antenna, an indicating device such as a headphone being connected to the receiver.

In a preferred embodiment of the present invention, the modulator includes a tube having a controlling grid circuit including a condenser, and a pair of scanning wires are respectively connected to the terminals of the condenser and adapted to scan signs printed or written with an electrically conductive material, a switch having a first position and a second position being provided for connecting the headphone, respectively, to the receiver and the modulator, whereby in the second position of the switch the modulator is directly coupled with the headphone to indicate oscillations when the circuit through the scanning wires is completed by the conductive material.

Preferably a resistor is provided shunting the condenser so as to control the tone in the headphone.

Preferably a casing not much larger than a pencil encloses the scanning wires and means, such as buttons, respectively, extend through opposite slots in the casing and are connected to the scanning wires for moving the ends of the scanning wires into and out of the casing.

When the device is to be used by a blind person, the antenna is preferably mounted in a cane and may advantageously have a reflector connected thereto to prevent waves emitted by the antenna from travelling in an undesired direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
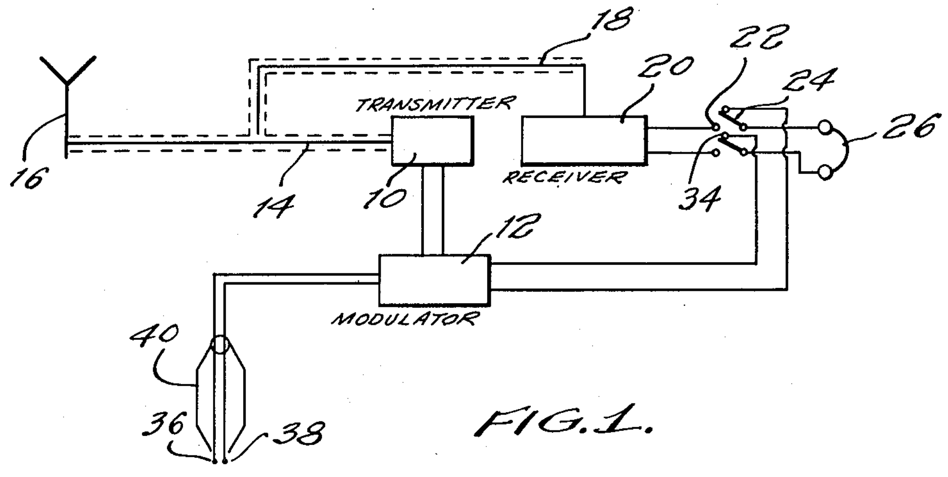
Fig. 1 is a block diagram of an embodiment of the present invention.

Referring now to the drawings and first to Figure 1, the device according to the present invention comprises a transmitter 10 generating high-frequency oscillations, for instance of 150 megacyles. The high-frequency oscillations are modulated preferably as to amplitude at an audio-frequency by a modulator 12 which is coupled to the transmitter 10 as more fully explained with reference to Figure 2. The transmitter 10 is also coupled with a first coaxial line 14 terminating in, and being coupled with, an antenna 16. The length of the coaxial line 14 preferably exceeds a quarter of the wave length of the high-frequency oscillations generated by the transmitter 10.

A second coaxial line 18 is coupled with the first coaxial line 14, preferably in an adjustable manner as more fully described hereinafter. The other end of the second coaxial line 18 is coupled with a receiver 20 connected to a first stationary contact 22 of a switch 24 connected to one end of a pair of headphones 26.

The modulator 12 is connected to a second stationary contact 34 of the switch 24 so that the headphones 26 can be directly connected to the modulator by bringing the switch 24 in contact with the second stationary contact 34. The modulator 12 is connected to two scanning wires 36 and 38 which are enclosed in a casing 40, the purpose of which will be explained more in detail hereinafter.

Figure 2:
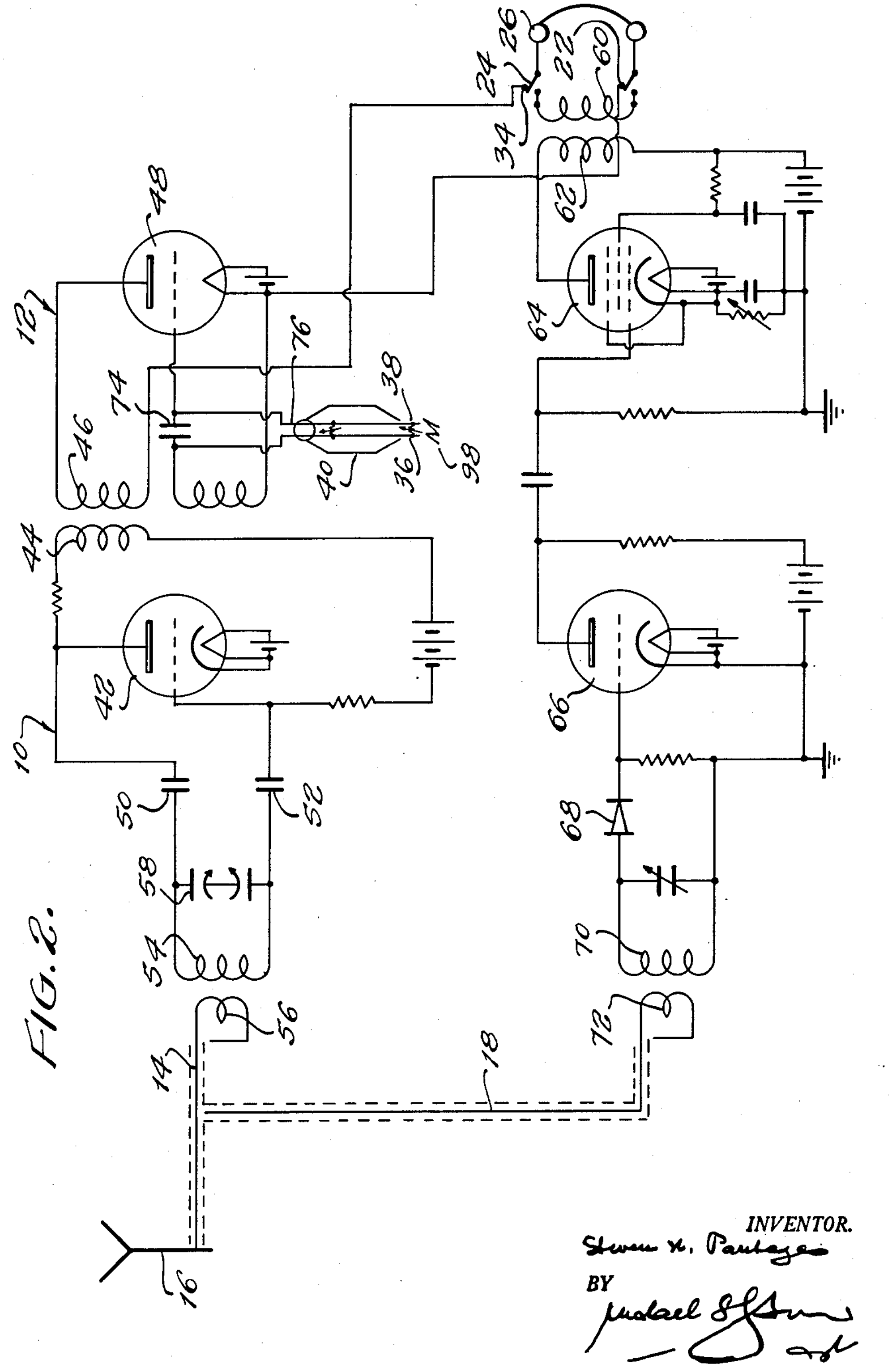
Fig. 2 is a wiring diagram of the device shown in Fig. 1.

Referring now to Figure 2 of the drawings, the transmitter 10 comprises an oscillating tube 42 the anode circuit of which contains a winding 44 coupled with a winding 46 provided in the anode circuit of a tube 48 forming part of the modulator 12. The transmitter 10 comprises fixed condensers 50, 52 in the grid-anode circuit thereof which are connected to a winding 54 which is coupled with a winding 56 connected to the first coaxial line 14 terminating in the antenna 16. The winding 54 is bridged by a variable condenser 58 provided for tuning purposes.

The winding 46 of the modulator 12 is connected to the second stationary contact 34 of the switch 24 connected to the headphone 26. The first stationary contact 22 of the switch 24 is connected to a winding 60 which is coupled with a winding 62 provided in the anode circuit of a tube 64 of the receiver which is capacitively coupled to a tube 66 the grid circuit of which contains a rectifier 68 and a tunable circuit comprising a winding 70 coupled with a winding 72 which is connected to the second coaxial line 18 coupled to the first coaxial line 14. Associated with tube 64 is a variable cathode resistor for controlling the volume of the sound in the headphone.

The grid circuit of the modulator 12 comprises a condenser 74 which is connected through a flexible cable 76 to the two scanning wires 36, 38 provided in the casing 40.

Figures 3, 4, 5:
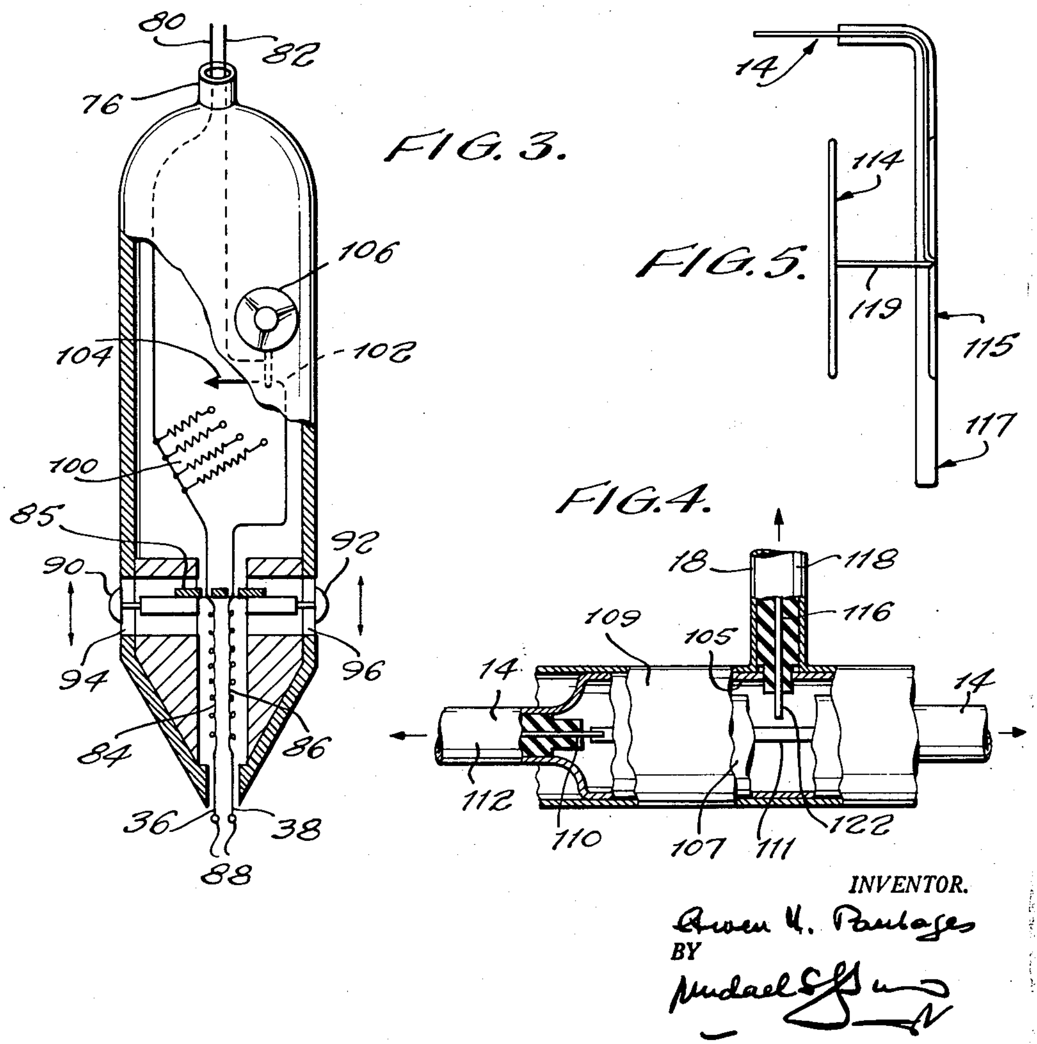
Fig. 3 is a detail of Fig. 2, partly in section.
Fig. 4 shows in a perspective view another detail of Fig. 2.
Fig. 5 shows a cane to which parts of the device are connected.

Referring now to Figure 3 showing the scanning wires 36, 38 and the casing 40 in greater detail, it will be seen that the wires 80 and 82 of the flexible cable 76 are connected, respectively, to the wires 36, 38, helical springs 84 and 86 being interposed between the wires 80, 82, and the scanning wires 36, 38, respectively. Springs 84 and 86 bear at their upper ends against a rigid member 85 through which wires 80 and 82 extend. The scanning wires 36, 38 are provided with spherical ends 88 which can be withdrawn into and pushed out of the casing 40 by means of buttons 90 and 92 connected to member 85 and being movable in slots 94 and 96 provided in the wall of the casing 40. Casing 40 is not much larger than a pencil. The scanning wires 36, 38 may scan signs 98 written or printed with an electrically conductive material (Fig. 2) which form an electrical connection between the wires 36 and 38 so that the circuit is completed. Furthermore, one or more resistors 100 are connected inside the casing 40 to the wire 80 whereas a second resistor 102 is connected to the wire 82 and to a contact 104 of a switch which can be adjusted by a knob 106. By a suitable adjustment of the knob the potentiometer consisting of one of the resistances 100 and the resistance 102 may connect the wires 80 and 82 and bridge the condenser 74, thereby providing a means for controlling the tone produced by the modulator 12 in the headphones.

Referring now to Figure 4, the coaxial line 14 is shown as comprising an inner conductor 110 concentrically located in an outer conductor 112. Outer conductor 112 is connected in any suitable manner to a tube 107 which is slotted along its length at 105, the slot 105 being of any desired length. Within tube 107 is located the conductor 111 which is connected at its opposite ends to the inner conductor 110 of line 14. Slidably mounted on tube 107 is tube 109 which is connected to the outer conductor 118 of coaxial line 18. The inner conductor 116 of line 18 extends through slot 105 and is located adjacent to conductor 111 so as to form an electrostatic or electromagnetic pickup. This construction permits line 18 to be located at a desired point on line 14 so as to permit the proper rigid level to be selected. The outer tube 109 prevents dust or other foreign matter from entering through the slot 105, and it also prevents radiation losses.

Figure 5 shows the device operatively connected to a cane 117 to be used by a blind person. The antenna, which may be directive or non-directive, or of any other suitable type, is shown as dipole 115 fed by line 14 which may conveniently be mounted in a groove in the cane. Reflector 114, which may for example be in the form of a tube, is located by rigid member 119 directly opposite to antenna 115 so as to prevent waves from travelling in an undesired direction back toward the person holding the cane.

The device described hereinabove operates as follows:

In the first position of the switch 24 in which the same makes contact with the stationary contact 22 the receiver 20 is connected to the headphones 26, the direct connection of the headphones 26 with the modulator 12 being interrupted. In this position the device serves as an obstacle detector and more particularly as a detector for use by a blind person, the antenna 16 being preferably arranged in a cane carried by the blind person, as shown in Figure 5. The transmitter 10 generates high-frequency oscillations which are amplitude modulated by the modulator 12 and transmitted to the first coaxial line 14 and to the antenna 16 which emits the modulated high-frequency oscillations. The antenna 16 and line 14 are designed to have sufficiently different impedances when the antenna is radiating into free space so that they will continue to be mismatched under all operating conditions, and this mismatch forms standing waves on coaxial line 14, the standing waves retaining the modulation characteristics of the amplitude modulated high frequency oscillations. The receiver 20 which is coupled to the first coaxial line 14 by the second coaxial line 18 picks up the amplitude modulated standing waves and produces after demodulation of the same an audible tone in the headphones 26. If the waves emitted from the antenna hit an obstacle, they are reflected back to the antenna and the impedance of the antenna 16 is modified thereby so as to change the standing waves on coaxial line 14 and the node points thereof which results in a change of volume of the audible tone in the headphones 26. Thus it is apparent that by amplitude modulating the high frequency oscillation output of the transmitter with an audio frequency, a person using the device will be able to hear the change of sound volume due to the shift of standing waves produced by changes in antenna impedance.

If the device is to be used for scanning signs such as letters or figures written or printed with an electrically conductive material, the switch 24 is switched over to the stationary contact 34 thereby connecting the headphones 26 directly to the modulator 12. The grid condenser 74 of the modulator is bridged by the wires 80 and 82 of the flexible cable 76, and the circuit is completed by the conductive material of the letters to be scanned. In consequence thereof a tone is heard through the headphones 26 whenever the scanning wires 36 and 38 slide with the spherical ends 88 thereof over a stretch of conductive material such as conductive ink. The potentiometer 100, 102 allows to adjust the tone. When the scanning wires are not connected by a conductive material, as when they are moved between letters, no tone is heard.

The antenna 16 can be attached to the hand or other part of the body of the wearer or to any part of a moving vehicle.

The receiver 20 and the headphones 26 serve as a standing wave indicator. If desired an oscilloscope, loudspeaker or meter can be used instead of the headphones. The modulator can be any audio frequency generator, electrical or mechanical, said generator having a circuit which is incomplete between two spaced points.

It will be understood that each of the elements described above, or two or more together, may also find a useful application in other types of devices for detecting objects by electrical oscillations differing from the types described above.

While the invention has been illustrated and described as embodied in an aid for the blind, it is not intended to be limited to the details shown, since various modifications and structural changes may be made without departing in any way from the spirit of the present invention.

Without further analysis, the foreging will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A cymatophone comprising, in combination, a transmitter for generating high frequency oscillations; a modulator coupled with said transmitter and modulating the high frequency oscillations with an audio frequency; a high frequency transmission line coupled to said transmitter; an antenna coupled to said transmission line for radiating the modulated high frequency oscillations generated by said transmitter, the impedance of said antenna, when radiating into free space, being substantially mismatched with respect to the impedance of said high frequency transmission line thereby forming standing waves on said transmission line under operating conditions; and a receiver coupled to said transmission line and indicating any change in the standing wave on the transmission line due to changes in impedance of said antenna caused by the reflection and absorption by an object of the radiated modulated high frequency oscillations.

2. A cymatophone comprising, in combination, a transmitter for generating high frequency oscillations; a modulator coupled with said transmitter and modulating the high frequency oscillations with an audio frequency; a high frequency transmission line coupled with said transmitter and having a length exceeding a quarter of the wave length of the high frequency oscillations generated by said transmitter; an antenna coupled to said transmission line for radiating the modulated high frequency oscillations generated by said transmitter; the impedance of said antenna, when radiating into free space, being substantially mismatched with respect to the impedance of said high frequency transmission line thereby forming standing waves on said transmission line under all operating conditions; receiving means; and means coupling said receiving means with said transmission line; said receiving means indicating any change in the standing waves on said transmission line due to changes in the impedance of said antenna caused by the reflection and absorption of an object of the modulated high frequency oscillations radiated from said antenna.

3. A cymatophone as in claim 2; wherein said high frequency transmission line is a first coaxial line and said antenna forms the termination of said first coaxial line; and wherein said means coupling the receiving means to the transmission line includes a second coaxial line coupled with said receiving means and adjustably connected with said first coaxial line so that the connection of said second coaxial line to said first coaxial line can be located at a desired point along the latter.

4. A cymatophone as in claim 3; wherein said receiving means includes a receiver which receives and demodulates waves picked up thereby from said second coaxial line, and a headphone connected to said receiver and operated by the demodulated waves from the latter.

5. A cymatophone as in claim 4; further comprising a cane adapted to be carried by a person and having said antenna mounted therein, and a reflector operatively connected with said antenna and preventing the modulated high frequency oscillations radiated from said antenna from traveling in unwanted directions.

6. A cymatophone as in claim 4; wherein said modulator includes a tube having a control grid circuit with a condenser in the latter and a resistor shunting said condenser to control the tone produced by said headphone; and further comprising a pair of scanning wires respectively connected to the opposite terminals of said condenser and adapted to scan signs of electrically conductive material, and a switch having first and second operative positions connecting said headphone to said receiver and to said modulator, respectively, so that, with said switch in said second position, said modulator directly feeds said headphone with a current when a conductive path is established between said scanning wires by a sign of conductive material.

7. A cymatophone as in claim 6; further comprising a casing around said scanning wires, and means operatively connected to said casing and scanning wires and effecting movement of the latter into and out of the casing.

8. A cymatophone as in claim 2; further comprising a cane having said antenna mounted therein and adapted to be carried by a person using the cymatophone.

9. A cymatophone as in claim 8; further comprising a reflector operatively connected to said antenna and preventing the travel in unwanted directions of modulated high frequency oscillations radiated from said antenna.

References Cited in the file of this patent

UNITED STATES PATENTS

| | | |
|---|---|---|
| 2,247,246 | Lindsay | June 24, 1941 |
| 2,395,928 | Willoughby | Mar. 5, 1946 |
| 2,431,344 | Reeves | Nov. 25, 1947 |
| 2,496,639 | Richardt et al. | Feb. 7, 1950 |
| 2,506,946 | Walker | May 9, 1950 |
| 2,510,710 | Moore | June 6, 1950 |
| 2,511,599 | Rochester | June 13, 1950 |
| 2,530,905 | Ortusi et al. | Nov. 21, 1950 |
| 2,580,560 | Larsen | Jan. 1, 1952 |

OTHER REFERENCES

Zworykin et al.: "Research on Reading Aids for the Blind," Journal of Franklin Institute, May 1949, pages 483–496; particularly pages 486–489.